United States Patent [19]

Takayanagi et al.

[11] Patent Number: 4,487,402
[45] Date of Patent: Dec. 11, 1984

[54] VIBRATION DAMPER DEVICE

[75] Inventors: Yoshiaki Takayanagi, Higashiyamato; Takao Matsunaga, Tachikawa, both of Japan

[73] Assignee: Komatsu Zenoah Co., Japan

[21] Appl. No.: 399,256

[22] Filed: Jul. 19, 1982

[30] Foreign Application Priority Data

Jul. 20, 1981 [JP] Japan ............... 56-106557[U]

[51] Int. Cl.³ .............................. F16F 15/02
[52] U.S. Cl. ................... 267/141.2; 188/379
[58] Field of Search ............ 188/378, 379, 380; 267/63 R, 137, 141, 141.1, 142.2, 153

[56] References Cited

U.S. PATENT DOCUMENTS 3,242,791 3/1966 Smith .................. 188/379
3,301,335 1/1967 Snelling ............... 267/141 X
4,188,073 2/1980 Ishikawa et al. ...... 188/379 X Primary Examiner—Duane A. Reger
Attorney, Agent, or Firm—Wigman & Cohen

[57] ABSTRACT

A vibration-damping device is disclosed for damping the vibrations between a vibration generating and a vibration receiving assembly such as is found with the casing and the handles of a chain saw. In a preferred embodiment, the chain saw casing is provided with a fitting hole having two pairs of radially projecting arcuate portions each designed for abutting engagement with radially projecting fitting members. The first fitting members are provided at the circumference of a cylinder of elastic material which is attached for the vibration receiving assembly. The second radially projecting fitting members are provided at the circumference of a head piece which mounts on the casing and holds the elastic cylinder in place.

3 Claims, 14 Drawing Figures

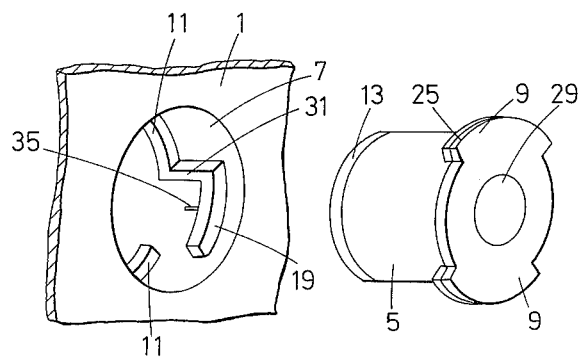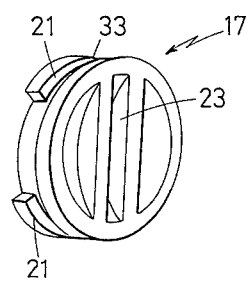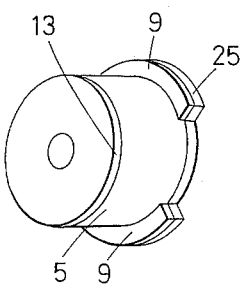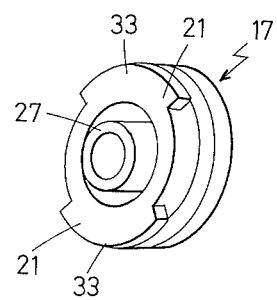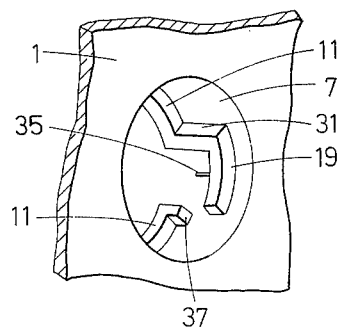

VIBRATION DAMPER DEVICE

BACKGROUND OF THE INVENTION

1. Field of the Invention

The present invention relates to a vibration damper device, and, more particularly, to a vibration damper for a chain saw which is interposed between a vibration source and a vibration receiver as well as a method for connecting them.

2. Description of the Prior Art

In conventional vibration dampers of the above mentioned type, a damper of elastic material such as rubber and elastomer is inserted between a vibration source and a vibration receiver in order to connect them. In that case, the connection means is, for example, such that washers are incorporated at both ends of a damper and both the vibration source and the vibration receiver are respectively connected with the damper by respective bolts projected fixedly from said washers. In the case of a chain saw, for example, because the main casing which contains a fixedly attached engine as a vibration source is connected by an intermediate damper with each end of the handle as a vibration receiver, the connections which are adapted to be handled from the outside are undesirable on account of their bad appearance. A cover etc. for concealing such connections is thereby required.

SUMMARY AND OBJECTS OF THE INVENTION

A first object of the present invention is to provide a vibration damper device which is adapted for use with a vibration device such as chain saw. A second object of the present invention is to provide a vibration damper device which may be assembled from the outside and yet presents a neat appearance. Those and further objects and advantages of the present invention will be apparent from the following description and accompanying drawings which, by way of illustration, show only a preferred embodiment of the present invention and the principles thereof.

BRIEF DESCRIPTION OF THE DRAWINGS

FIGS. 12 and 13 are respectively perspective aspects from another direction of the principal parts, and FIG. 14 is a perspective aspect of the principal part of another example of the embodiment.

DESCRIPTION OF THE PREFERRED EMBODIMENTS

Figure 1:
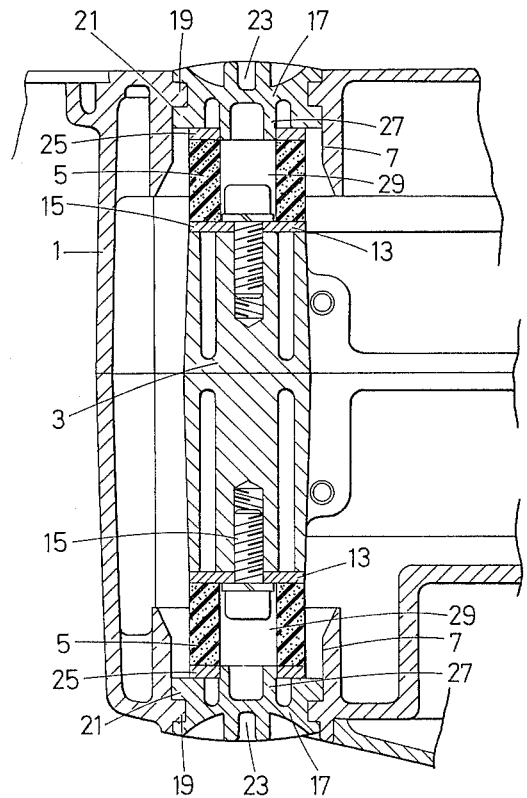
FIG. 1 is an illustrative aspect of horizontal cross section of an embodiment of the present invention.
Figure 2:
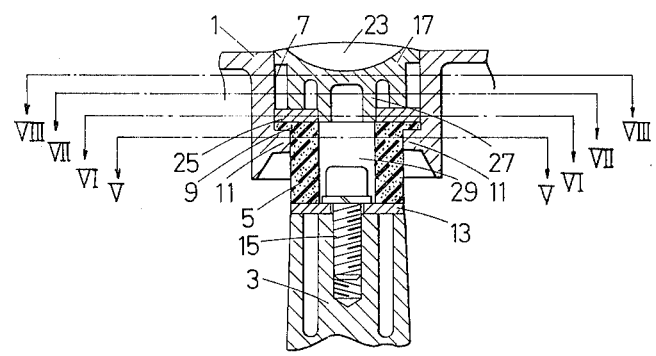
FIG. 2 is a vertical cross section aspect of the principal part.
Figure 3:
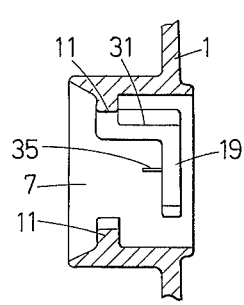
FIGS. 3 and 4 are vertical cross section aspects of other principal parts and lateral elevation respectively.
Figure 4:
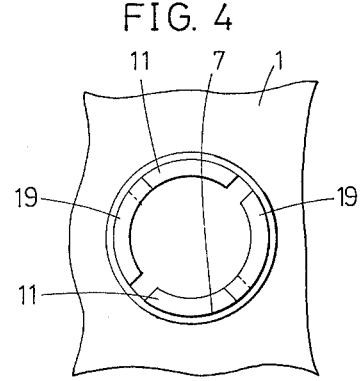
Figure 5:
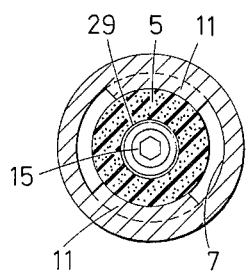
FIGS. 5, 6, 7 and 8 are respectively cross section aspects along Lines V—V, VI—VI, VII—VII and VIII—VIII of FIG. 2, FIGS. 9, 10 and 11 are respectively prospective aspects of principal parts.
Figure 6:
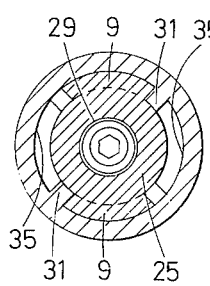
Figure 7:
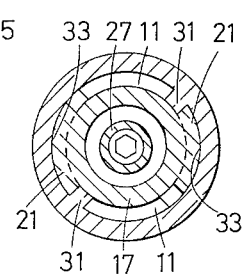
Figure 8:
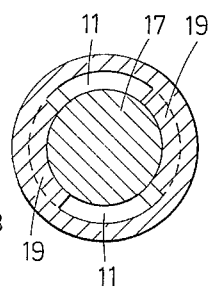

In FIGS. 1-13, a first assembly 1 is illustrated which is the fixed principal casing containing a chain saw engine (not presented in drawings). It is equally divided in the middle. A second assembly 3 contains the fixed rear handle (not presented in drawings). In the present exemplified embodiment, the first assembly 1 is a vibration source and the second assembly 3 is a vibration receiver. A cylinder 5 of elastic material such as rubber etc. is fitted into the fitting hole 7 formed in the first assembly 1. As shown in FIG. 12, first fitting members 9, 9 corresponding respectively to a length of substantially one fourth of circumference of the cylinder 5 and being projected laterally at one end thereof are placed in abutting engagement with first arcuate fitting ring portions 11, 11 projecting radially from the internal wall of fitting hole 7. A seat plate 13 incorporated with the other end of cylinder 5 is attached to the second assembly 3 by a fixture 15 such as screw. A head member 17 is also fitted in the fitting hole 7 outside the cylinder 5. Second arcuate fitting projecting portions 19 are formed on the internal wall of the fitting hole 7 and are axially spaced from and different in angular phase from the first fitting ring projections 11. When the head member 17 is inserted into the fitting hole 7, the fitting member 21 projecting from said head 17 is placed in abutting engagement with the second projections 19.

A fitting groove 23 arranged in the external wall of the head 17 is adapted for engagement with a round planar tool such as coin to rotate the head 17. A reinforcing plate 25 for the first fitting members 9, 9 is incorporated with cylinder 5. The projection 27 is projected internally from the head 17 and is fitted in the hole 29 formed by the center of cylinder 5 to position correctly the center of cylinder 5.

An axially mounted stopper 31 extends perpendicularly between the first fitting projecting portion 11 and the second fitting projecting portion 19. When the cylinder 5 is rotated rightwards for fixing, the abutment of the first fitting member 9 stops cylinder 5 thereby preventing the rotation thereof. When the head 17 is rotated counterclockwise, the abutment of the second fitting member 21 positions the head 17. A fitting groove 33 arranged axially in the outer circumference of second fitting member 21 of the head 17 is fitted to the fitting member 35 projected axially inside the fitting hole 7 to control the rotation of the head 17 and to prevent the separation thereof.

In the above exemplified embodiment, before the first assembly 1 and the second assembly 3 are connected through the cylinder 5, the first assembly 1 combined with divided portion and the second assembly 3 have been over-laid together and correctly positioned. Then the cylinder 5 is inserted into the fitting hole 7 so that the seat plate 13 of cylinder 5 may be fixedly secured to the second assembly 3 by a screw 15 which is inserted into the hole 29. The first fitting member 9 may be placed in abutting engagement with the first arcuate fitting portion projections 11. Subsequently the head 17 is inserted in the fitting hole 7 by means of a disc tool which engages the fitting groove 23. The head 17 is then rotated counterclockwise by about 90° till the end of second fitting member 21 abuts against stopper 31, so that the fitting second member 21 is in abutting engagement with the second projecting fitting portion 19 thereby pushing to retain the cylinder 5 while the head 17 is retainingly engaged simultaneously with the fitting hole 7. Accordingly the transmission of vibration from the first assembly 1 to the second assembly 3 is prevented by the cylinder 5 of elastic material.

FIG. 14 illustrates another example of embodiment. There are arranged both the stopper 31 for the first fitting projecting portion 11 and a stopper 37 for butting the first fitting member 9 of cylinder 5. When the head 17 is rotated counterclockwise, these stoppers 31, 37 serve to prevent cylinder 5 from rotating on account of friction thus loosening the fixture or screw 15 and to prevent the rotation of cylinder 5 by the fitting member 9. Also the stoppers 31, 37 may be mounted to respective contrary positions so that the head 17 rotates clockwise. The present invention, being constructed as set forth in what is claimed, permits easy assembly and disassembly from outside. Moreover as the connections are concealed with a cover, it gives a good appearance. Additionally, since as the vibration damper device is simple, its production cost is reduced.

Though in the described exemplified embodiment the first assembly is the vibration source and the second assembly is the vibration receiver, they may be vice versa.

Although only a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. A vibration-damping device for damping transmission of vibrations between a first assembly and a second assembly, said first assembly having a fitting hole formed therethrough, said device comprising:

first arcuate projections projected radially inwardly from the internal wall of said fitting hole;

second arcuate projections formed on the internal wall of said fitting hole, said second projections being axially spaced from and different in angular phase from said first projections;

an elastic member being interposed between said first and second assemblies and fixedly secured at its one end to said second assembly, said elastic member having at its opposite end first fitting members formed around the outer periphery thereof for abutting engagement with said first arcuate projections on the internal wall of said fitting hole; and a head adapted to be fitted in said fitting hole and having second fitting members formed on the outer periphery thereof, said second fitting members being in abutting engagement with said second projections on the internal wall of said fitting hole when said head is turned through a certain angle relative to said first assembly.

2. A vibration-damping device as set forth in claim 1, further comprising a stopper formed at one end of each of said first arcuate projections for abutting engagement with said first arcuate fitting members of said elastic member.

3. A vibration-damping device as set forth in claim 1, wherein said elastic member is formed at its center with an axial hole, and said head is formed at its center with an axially extending positioning projection adapted to be fitted into said axial hole in said elastic member.

* * * * *